UNITED STATES PATENT OFFICE.

CARL RUMPFF, OF APRATH, NEAR ELBERFELD, PRUSSIA, GERMANY.

MANUFACTURE OF DYE-STUFF OR COLORING-MATTER.

SPECIFICATION forming part of Letters Patent No. 256,380, dated April 11, 1882.

Application filed January 13, 1882. (No specimens.) Patented in England March 21, 1881, in France March 31, 1881, in Belgium April 15, 1881, and in Germany October 11, 1881.

*To all whom it may concern:*

Be it known that I, CARL RUMPFF, residing at Aprath, near Elberfeld, in the Kingdom of Prussia and Empire of Germany, have invented a new and useful Improvement in the Manufacture of Dye-Stuffs or Coloring-Matters, of which the following is a specification.

My invention relates to a new scarlet dye-stuff which results from the reaction of diazoazo-benzole-monosulphonic acid with the soda salt of my alpha-monosulphonic acid of beta-naphthol.

The preparation and properties of my alpha-monosulphonic acid of beta-naphthol, and also of its sodium salt, are described in my application for patent filed April 8, 1881.

I prepare my new dye-stuff as follows: I dissolve fifty kilograms of the monosulphonic acid of the amidoazo-benzole in five hundred liters of water, to which the necessary quantity of ammonia has been added, and cool the mixture to about 5° centigrade. To the cooled mixture I add eighty kilograms of muriatic acid and fifty kilograms of pure nitrite of soda of one hundred per cent. strength, and then I allow the whole to stand at rest for several hours, when the transformation into diazoazo-benzole will have been completed. In the next operation I slowly pour the mixture prepared as described into a solution composed as follows: seventy-five kilograms of my crystallized alpha-monosulphonic acid of beta-naphthol, preferably in the form of its soda salt, although other similar salts of my new acid may be used, dissolved in five hundred liters of water to which had been added one hundred and forty kilograms of ammonia of ten per cent. strength. The new coloring-matter is immediately formed, as shown by the following equation:

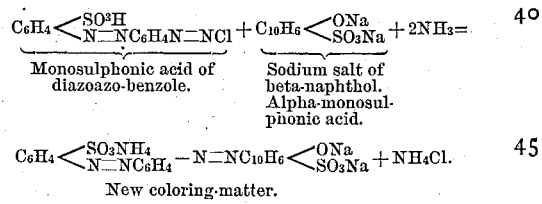

Monosulphonic acid of diazoazo-benzole. Sodium salt of beta-naphthol. Alpha-monosulphonic acid.

New coloring-matter.

The coloring-matter is precipitated by the addition of common salt, and is purified by re-dissolving and reprecipitation.

The proportions of the ingredients named in the foregoing description are susceptible of considerable variation without materially affecting the result.

I claim—

As a new product, the new scarlet dye-stuff which results from the reaction of diazoazo-benzole with alpha-monosulphonic acid of beta-naphthol, substantially as described.

CARL RUMPFF.

Witnesses:
J. FERD. KEDENBURG,
J. BOCK.